(12) United States Patent
Pelletier et al.

(10) Patent No.: US 7,260,196 B2
(45) Date of Patent: Aug. 21, 2007

(54) METHOD AND SYSTEM FOR PROVIDING ENHANCED CALLER IDENTIFICATION AND PRIVACY MANAGEMENT

(75) Inventors: Karen Jeanne Pelletier, Crystal Lake, IL (US); Raymond Walden Bennett III, Naperville, IL (US); Michael Steven Pickard, Highland Park, IL (US); Wayne Robert Heinmiller, Elgin, IL (US); Edmond W Israelski, Lake Barrington, IL (US); Jordan Howard Light, Mt. Prospect, IL (US); Rex Norman Bull, St. Charles, IL (US)

(73) Assignee: SBC Properties, L.P., Reno, NV (US)

( * ) Notice: Subject to any disclaimer, the term of this patent is extended or adjusted under 35 U.S.C. 154(b) by 235 days.

(21) Appl. No.: 10/873,756

(22) Filed: Jun. 21, 2004

(65) Prior Publication Data

US 2005/0013424 A1    Jan. 20, 2005

Related U.S. Application Data

(63) Continuation of application No. 10/273,620, filed on Oct. 18, 2002, now Pat. No. 6,771,754, which is a continuation of application No. 09/272,201, filed on Mar. 19, 1999, now Pat. No. 6,496,569.

(51) Int. Cl.
*H04M 1/56* (2006.01)
*H04M 3/42* (2006.01)

(52) U.S. Cl. ............................ 379/142.01; 379/142.06; 379/207.14; 379/207.15

(58) Field of Classification Search .............. 379/67.1, 379/88.12, 88.19–23, 142.01–142.03, 142.06–142.08, 379/201.01, 201.07–201.08, 201.1–201.11, 379/207.13, 207.15–207.16, 210.02–210.03, 379/207.14; 455/414–415
See application file for complete search history.

(56) References Cited

U.S. PATENT DOCUMENTS

| | | |
|---|---|---|
| 4,488,005 A | 12/1984 | Frantz |
| 5,033,076 A | 7/1991 | Jones et al. |
| 5,060,255 A | 10/1991 | Brown |

(Continued)

*Primary Examiner*—Binh K. Tieu
(74) *Attorney, Agent, or Firm*—Brinks Hofer Gilson & Lione

(57) ABSTRACT

Processing a call from a calling party at a calling communication station to a called communication station includes detecting signalling information for the call, including determining whether standard caller identification for the calling communication station can be provided to the called communication station and detecting a privacy level selected by a called party at the called communication station. The call is routed in response to the signalling information and the privacy level. This permits management of privacy levels at the called communication station using the signalling information for the call.

7 Claims, 10 Drawing Sheets

U.S. PATENT DOCUMENTS

| | | | |
|---|---|---|---|
| 5,228,080 A | | 7/1993 | Nutter et al. |
| 5,276,731 A | | 1/1994 | Arbel et al. |
| 5,347,574 A | | 9/1994 | Morganstein |
| 5,467,388 A | * | 11/1995 | Redd et al. ............ 379/210.02 |
| 5,497,414 A | * | 3/1996 | Bartholomew ......... 379/142.02 |
| 5,511,111 A | * | 4/1996 | Serbetcioglu et al. .... 379/88.01 |
| 5,521,969 A | | 5/1996 | Paulus et al. |
| 5,533,106 A | | 7/1996 | Blumhardt |
| 5,533,107 A | | 7/1996 | Irwin et al. |
| 5,550,904 A | | 8/1996 | Andruska et al. |
| 5,559,860 A | | 9/1996 | Mizikovsky |
| 5,604,791 A | | 2/1997 | Lee |
| 5,623,537 A | | 4/1997 | Ensor et al. |
| 5,757,899 A | | 5/1998 | Boulware et al. |
| 5,809,111 A | | 9/1998 | Matthews |
| 5,850,435 A | | 12/1998 | Devillier |
| 5,875,240 A | * | 2/1999 | Silverman .............. 379/142.07 |
| 5,905,774 A | | 5/1999 | Tatchell et al. |
| 5,920,615 A | | 7/1999 | Nolde |
| 5,937,052 A | | 8/1999 | Cook-Hellberg |
| 6,031,899 A | | 2/2000 | Wu |
| 6,101,251 A | | 8/2000 | Strickland |
| 6,122,347 A | | 9/2000 | Boland |
| 6,160,877 A | * | 12/2000 | Tatchell et al. ............. 379/197 |
| 6,178,232 B1 | | 1/2001 | Latter et al. |
| 6,219,414 B1 | | 4/2001 | Maciejewski et al. |
| 6,298,122 B1 | | 10/2001 | Horne |
| 6,332,021 B2 | | 12/2001 | Latter et al. |
| 6,341,161 B1 | | 1/2002 | Latter et al. |
| 6,400,809 B1 | | 6/2002 | Bassemeyer, Jr. et al. |

* cited by examiner

METHOD AND SYSTEM FOR PROVIDING ENHANCED CALLER IDENTIFICATION AND PRIVACY MANAGEMENT

RELATED APPLICATIONS

This application is a continuation of application Ser. No. 10/273,620, filed Oct. 18, 2002 now U.S. Pat. No. 6,771,754 pending, which is a continuation of application Ser. No. 09/272,201 filed Mar. 19, 1999, now U.S. Pat. No. 6,496,569 B2, all of which applications are incorporated herein in their entirety by this reference.

BACKGROUND

The present invention relates generally to telecommunications services and more particularly to caller identification. More particularly, the present invention relates to automatic management of incoming calls at a called telephone.

Telecommunications service providers typically offer services that attempt to provide customers with information that enables them to determine whether or not to accept a call before answering the call. One service that provides such information is caller identification ("Caller ID"). Standard Caller ID services generally provide a customer with an indication of who is calling without requiring the customer to answer the call. These systems typically retrieve information about the calling party from a database and provide that information to the called party. Customer premise equipment (CPE) in the form of a display device is generally used to provide the called party with a visual readout of the name and/or telephone number associated with the calling party.

However, the effectiveness of Caller ID systems can be reduced due to a number of different occurrences. One common occurrence that decreases the effectiveness of Caller ID systems is the inability of a service provider to provide the standard Caller ID information for a particular incoming call. A service provider may not be able to provide the standard Caller ID information if the Caller ID information is blocked by the calling party, or if the Caller ID information is unavailable or incomplete, or if the calling party has caused his Caller ID information to be marked private. When the standard Caller ID information cannot be provided, the called party is not adequately informed about who is calling and cannot determine whether or not to accept the incoming call before answering the call. Because the effectiveness of Caller ID systems is greatly reduced when information cannot be provided, an improved system and method for providing caller identification information that overcomes these deficiencies are needed.

One known system determines if standard Caller ID information associated with a calling party can be provided to the called party. Such a system is described in copending application Ser. No. 09/122,484, filed Jul. 24, 1998, commonly assigned to the assignee of the present application and incorporated herein by reference. If the standard Caller ID cannot be provided, the system transmits a request for audible caller identification information to the calling party. The provided audible caller identification information is then provided to the called party to decide to answer the call.

Some subscribers prefer additional flexibility in managing incoming calls. Such subscribers prefer to vary the levels of privacy according to their daily schedule or circumstances. One system allows the subscriber to establish a schedule of times when incoming calls are blocked. Also, the system allows establishment of tiers of access in which calls on some tiers are blocked while others are permitted. This system provides some additional flexibility for the subscriber but requires substantial time and effort to set up the access tiers and to assign calling numbers to the tiers. A less cumbersome system and method for managing incoming calls are required.

DETAILED DESCRIPTION OF THE PRESENTLY PREFERRED EMBODIMENTS

By way of introduction, the preferred embodiments described below include a method and system for providing a called party with audible caller identification information when standard caller identification information cannot be provided, and completing calls in accordance with a privacy mode or level selected by the called party. In one embodiment, the called party selects the level of privacy to use at a given time. At the highest level of privacy, all calls are routed to a voice messaging system. At a next level of privacy, all callers are prompted for audible caller identification information which is then transmitted to the called party who may elect to take the call. At a next level of privacy, calls for which standard caller identification information is blocked, unavailable, incomplete or marked private are prevented from being connected to the called party. Instead of connecting the calls, a request for audible caller identification information is transmitted to the calling party. If the calling party provides the requested audible caller identification information, the audible information is transmitted to the called party. At a next level of privacy, calls with blocked caller identification information are cancelled and a message is played to the caller. Other calls are completed. This allows the called party to manage the level of privacy afforded the called telephone by making use of caller identification signalling information included with the call.

Figure 1:
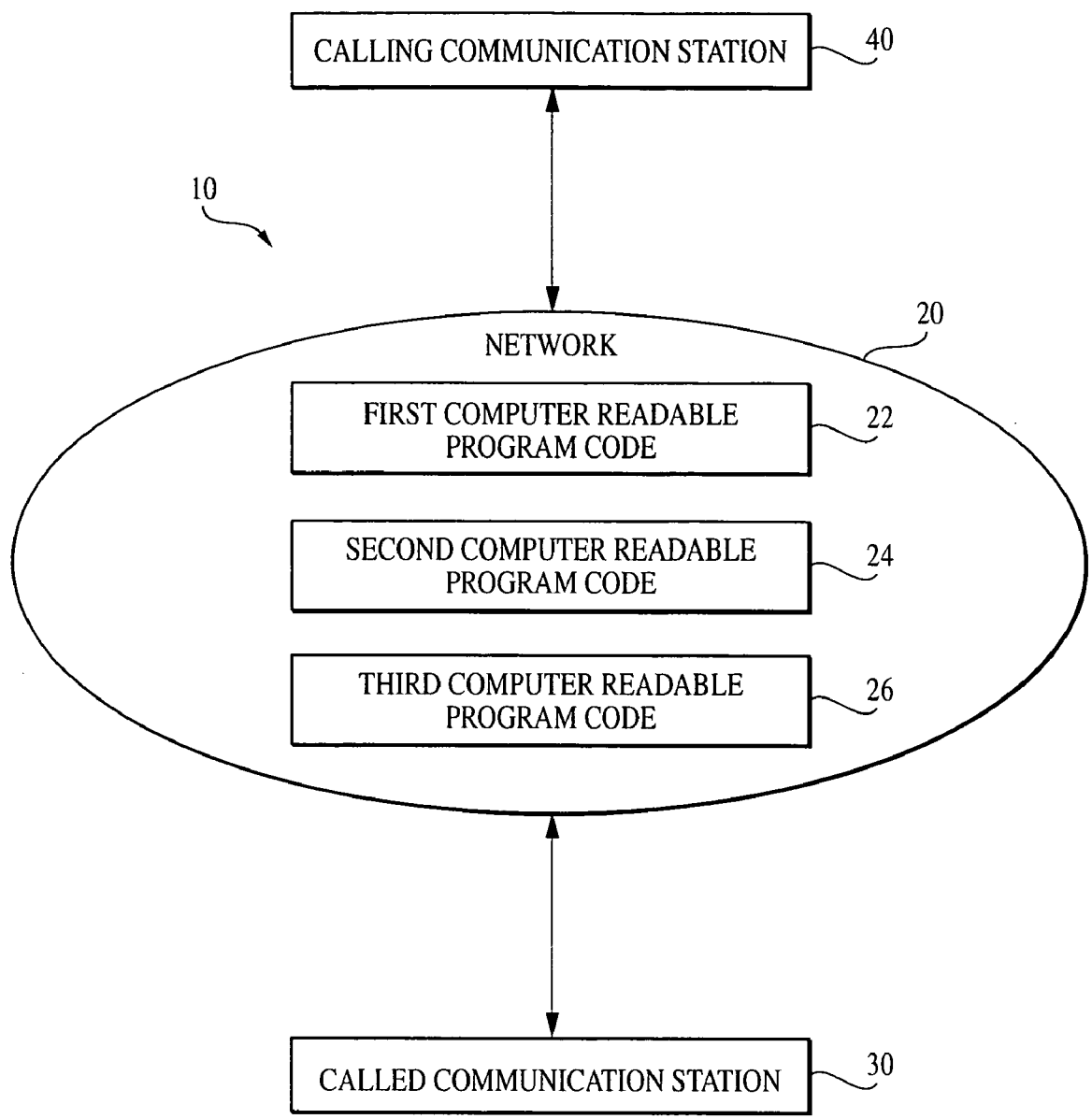
FIG. 1 is a block diagram of a telecommunications system of a preferred embodiment.

By way of example, FIG. 1 depicts a system 10 of a preferred embodiment. The system 10 comprises a network 20, a called communication station 30 coupled with the network 20 and a calling communication station 40 coupled with the network 20. The term "coupled with," as used herein, means directly coupled with or indirectly coupled with through one or more components. The network 20 preferably comprises a computer usable medium having first, second and third computer readable program s 22, 24, 26 embodied therein. It is important to note that while the program codes 22, 24, 26 have been shown as three separate elements, their functionality can be combined and/or distributed. It is also important to note that "medium" is intended to broadly include any suitable medium including analog or digital, hardware or software, now in use or developed in the future.

The system 10 is preferably implemented in a telecommunications network as known to those skilled in the art. Alternatively, the system 10 can be implemented in a computer network or any other network that is adapted to transmit, store and retrieve information. The calling communication station 40 and the called communication station 30 preferably comprise analog telephone stations as known to those skilled in the art. According to an alternative embodiment, the communication stations 30, 40 can comprise any suitable communication station adapted for use in the present embodiments as known to those skilled in the art.

Figure 2:
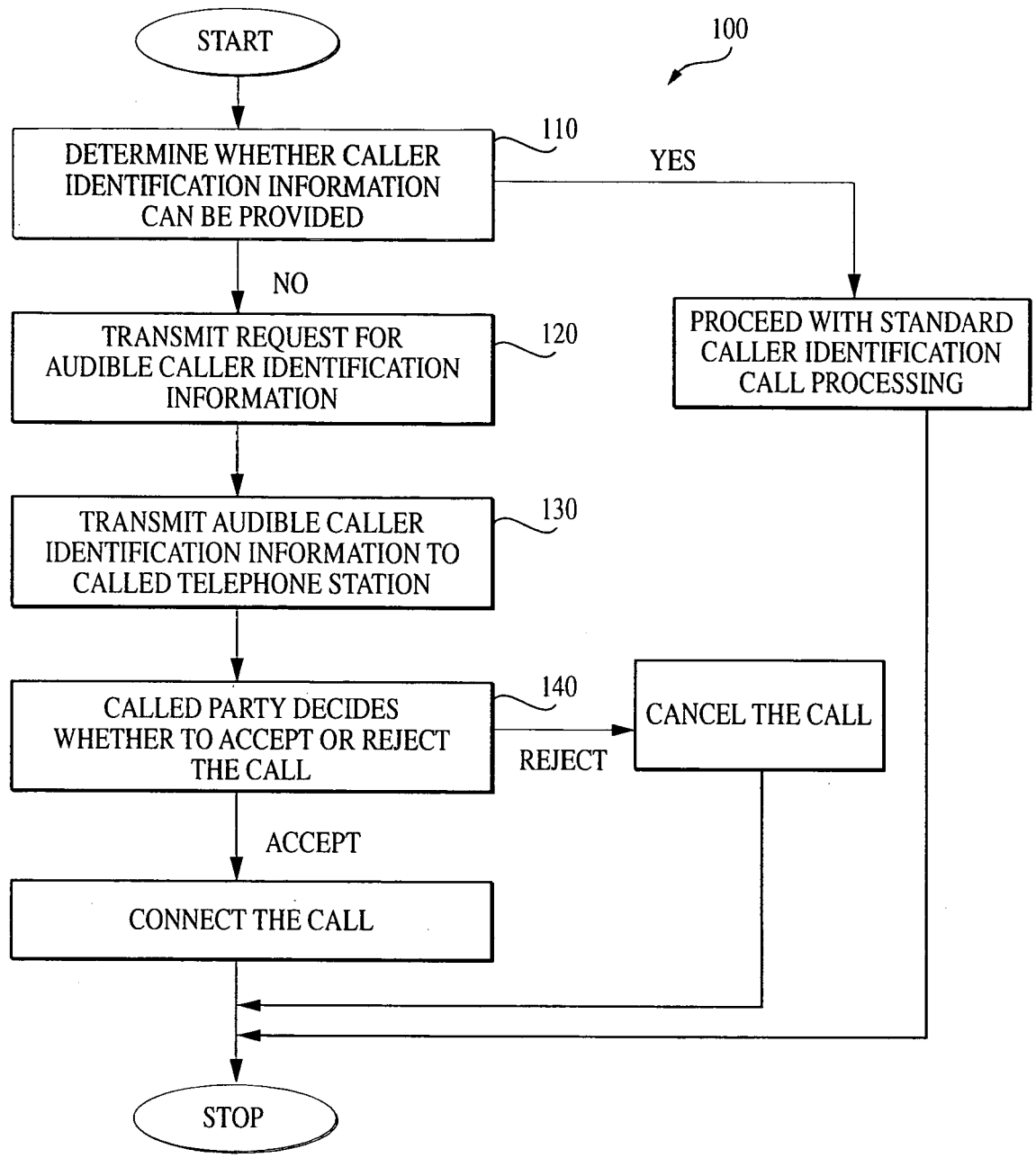
FIG. 2 is a flow chart of a method of one embodiment for providing enhanced caller identification.

The system 10 of FIG. 1 can be used to implement the method 100 depicted in FIG. 2. When the calling party at the calling communication station 40 places a call to a called party at the called communication station 30, the first computer readable program code 22 determines whether standard caller identification information associated with the calling communication station 40 can be provided to the called communication station 30 (step 110, FIG. 2). As used herein, the term standard caller identification (Caller ID) information means the information associated with a calling communication station that is typically stored in a database and automatically retrieved and provided to a called party as known to those skilled in the art. If it is determined that standard caller identification information cannot be provided, the second computer readable program code 24 transmits a request for audible caller identification information to the calling communication station 40 (step 120). As used herein, the term audible caller identification information means audible information provided by the calling party in response to a request for such information. If the calling party provides the requested audible caller identification information, the third computer readable program code 26 transmits the audible caller identification information to the called communication station 30 (step 130). After receiving the audible caller identification information, the called party can decide whether to proceed with the call or cancel the call (step 140).

Figure 3:
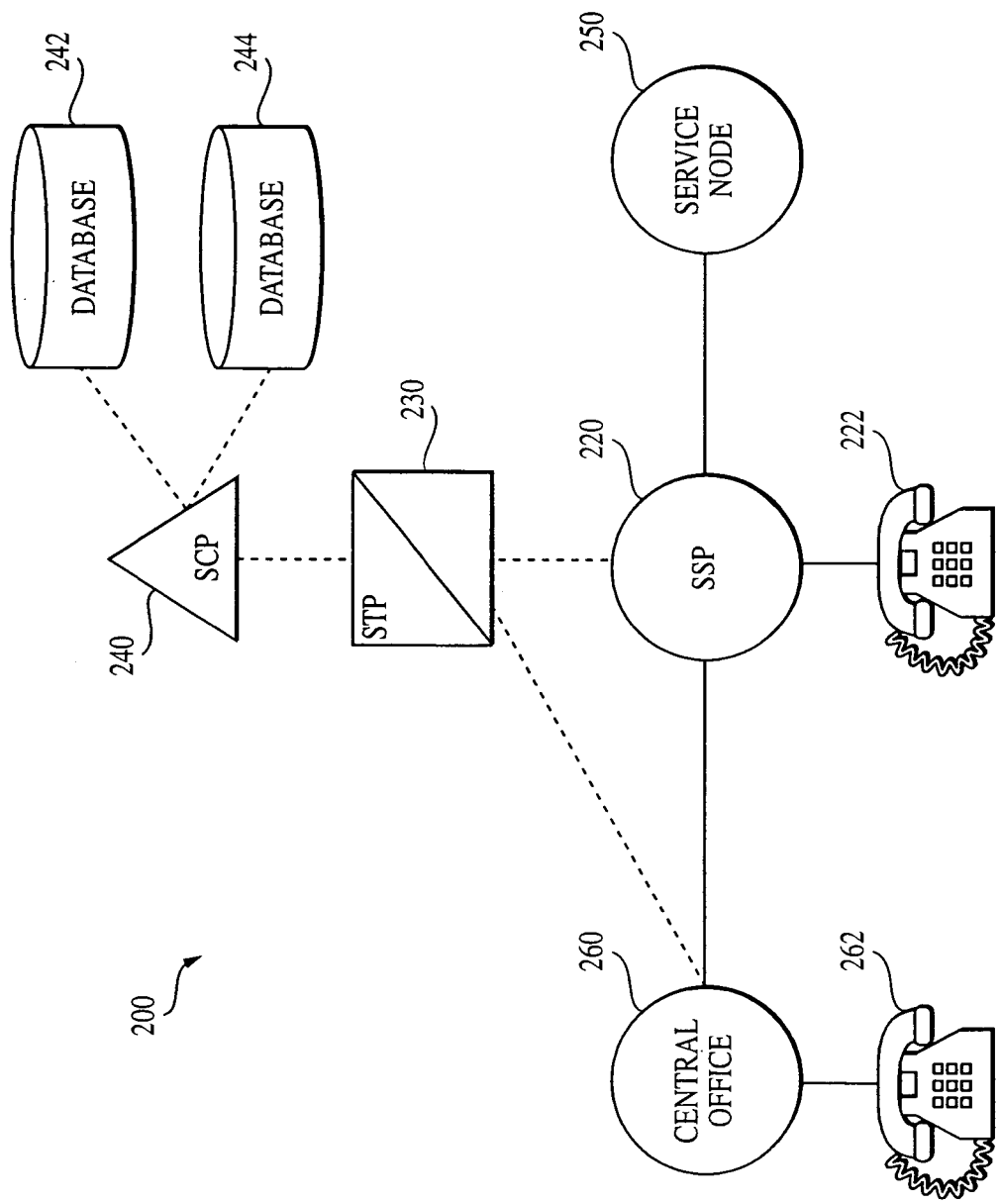
FIG. 3 is a block diagram of a first preferred embodiment of the telecommunications system of FIG. 1.

By way of further example, FIG. 3 depicts a preferred embodiment of the system 10 described above. The system 200 comprises a service switching point (SSP) 220, a signal transfer point (STP) 230, a service control point (SCP) 240, a first SCP database 242, a second SCP database 244, a service node (SN) 250, a central office 260, called telephone station 222 and calling telephone station 262. Intelligent network system components, commonly referred to as advanced intelligent network (AIN) components, suitable for implementing the present embodiment are commercially available from several vendors and are known to those skilled in the art. AIN components can implement computer readable program code as known to those skilled in the art. Vendors of AIN components typically have a preferred programming language and operating platform as known to those skilled in the art.

SSP 220 preferably comprises an AIN switch that routes calls, recognizes and responds to triggers, generates queries to obtain call information and responds to returned call information. SSP 220 connects called telephone station 222 with central office 260 to enable calls to be placed between called telephone station 222 and calling telephone station 262. SSP 220 preferably communicates with SCP 240, central office 260 and SN 250 by utilizing a signaling protocol such as Signaling System 7 (SS7) or other such signaling protocols as presently known to those skilled in the art or developed in the future. SSP 220 preferably generates queries to SCP 240 and receives and responds to responses to the queries returned from SCP 240.

STP 230 preferably comprises a network element that transfers signaling communications in response to signaling protocols such as SS7 or other such signaling protocols as presently known to those skilled in the art or developed in the future. STP 230 preferably transfers queries from SSP 220 to SCP 240 and transfers responses to the queries from SCP 240 to SSP 220.

SCP 240 preferably comprises an AIN element that stores call information and receives and responds to queries. SCP 240 preferably stores call control information in the first SCP database 242 and can access the stored call control information. SCP 240 also stores standard caller identification information in the second SCP database 244 and can access the stored caller identification information. SCP 240 receives queries generated by SSP 220 and preferably responds to the queries by performing database searches to locate the requested call control information or caller identification information as known to those skilled in the art. SCP 240 can forward the call control information or caller identification information to SSP 220.

SN 250 preferably comprises a network element that enables communications between telephone stations 222, 262 and the network. SN 250 can preferably transmit messages to and receive responses from telephone stations 222, 262. SN 250 can generate announcements that can be transmitted to telephone stations 222, 262. SN 250 can transmit responses such as audible caller identification information from telephone station 262 to telephone station 222 by connecting telephone stations 222, 262 or by recording and playing back the responses as known to those skilled in the art. The announcements transmitted to telephone station 222 preferably comprise accept and reject options along with requests for input from the telephone station 222. The requests for input preferably comprise requests for input that can be used by SN 250 to cancel calls to telephone station 222, connect calls to telephone station 222, forward calls to a voice mail system or another location such as another telephone line, and transmit messages to telephone station 262. As used herein, the term voice mail system means all types of message recording systems as known to those skilled in the art. SN 250 can preferably receive and respond to the input transmitted from telephone station 222. The term input means any suitable signal such as DTMF tones, voice input, dial pulse input or modem/fax input as known to those skilled in the art.

Database 242 preferably comprises a data storage element for use with SCP 240 as known to those skilled in the art. Database 242 preferably stores call control information that can be implemented by SSP 220 to control calls. Such call control information is known to those skilled in the art.

Database 244 preferably comprises a standard caller identification with name database as known to those skilled in the art. Database 244 preferably includes the name of the person associated with calling telephone station 262 along with the telephone number that is associated with calling telephone station 262. Database 244 can alternatively comprise a caller assistance database as known to those skilled in the art. While databases 242, 244 are depicted within a telecommunications system, databases 242, 244 can comprise any suitable databases containing information adapted for use in the present embodiment and are not limited to databases located within a telecommunications network. It is also important to note that while databases 242, 244 are shown as separate components, they can be implemented as a single database.

Central office 260 preferably comprises an AIN network switch as known to those skilled in the art. Central office 260 enables calls to be placed between calling telephone station 262 and called telephone station 222. Alternatively, central office 260 can comprise a non-AIN network switch as known to those skilled in the art.

Telephone stations 222, 262 preferably comprise analog telephone sets as known to those skilled in the art. Alternatively, telephone stations 222, 262 can comprise wireless, PCS, ISDN or any other form of communication station known to those skilled in the art. Called telephone station 222 preferably includes CPE equipment for use with caller identification services as known to those skilled in the art.

Figure 4:
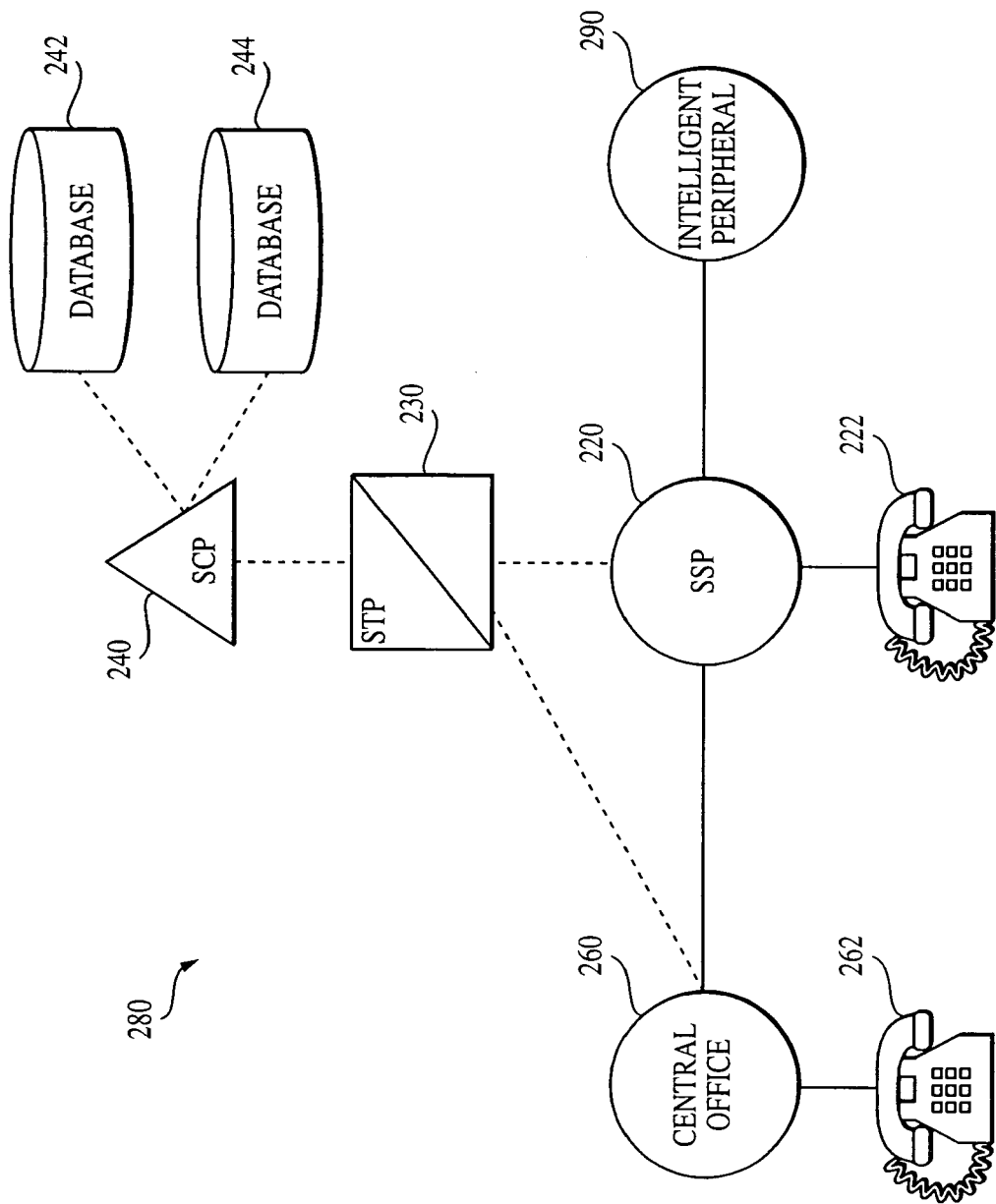
FIG. 4 is a block diagram of a second preferred embodiment of the telecommunications system of FIG. 1.

Referring now to FIG. 4, an alternate embodiment of the system of FIG. 3 is shown. The system 280 comprises an SSP 220; a called telephone station 222; an STP 230; an SCP 240; a first SCP database 242, a second SCP database 244, a central office 260 and a calling telephone station 262, all as described above in reference to FIG. 3. The system 280 also includes an intelligent peripheral (IP) 290 that communicates with SSP 220 and performs the same functions as the SN 250 as described herein. The IP 290 has an ability to communicate with the SCP 240 using either a communication network such as TCP/IP connecting the IP 290 and the SCP 240 or alternatively by communicating indirectly with the SCP 240 through the SSP 220.

Figure 5:
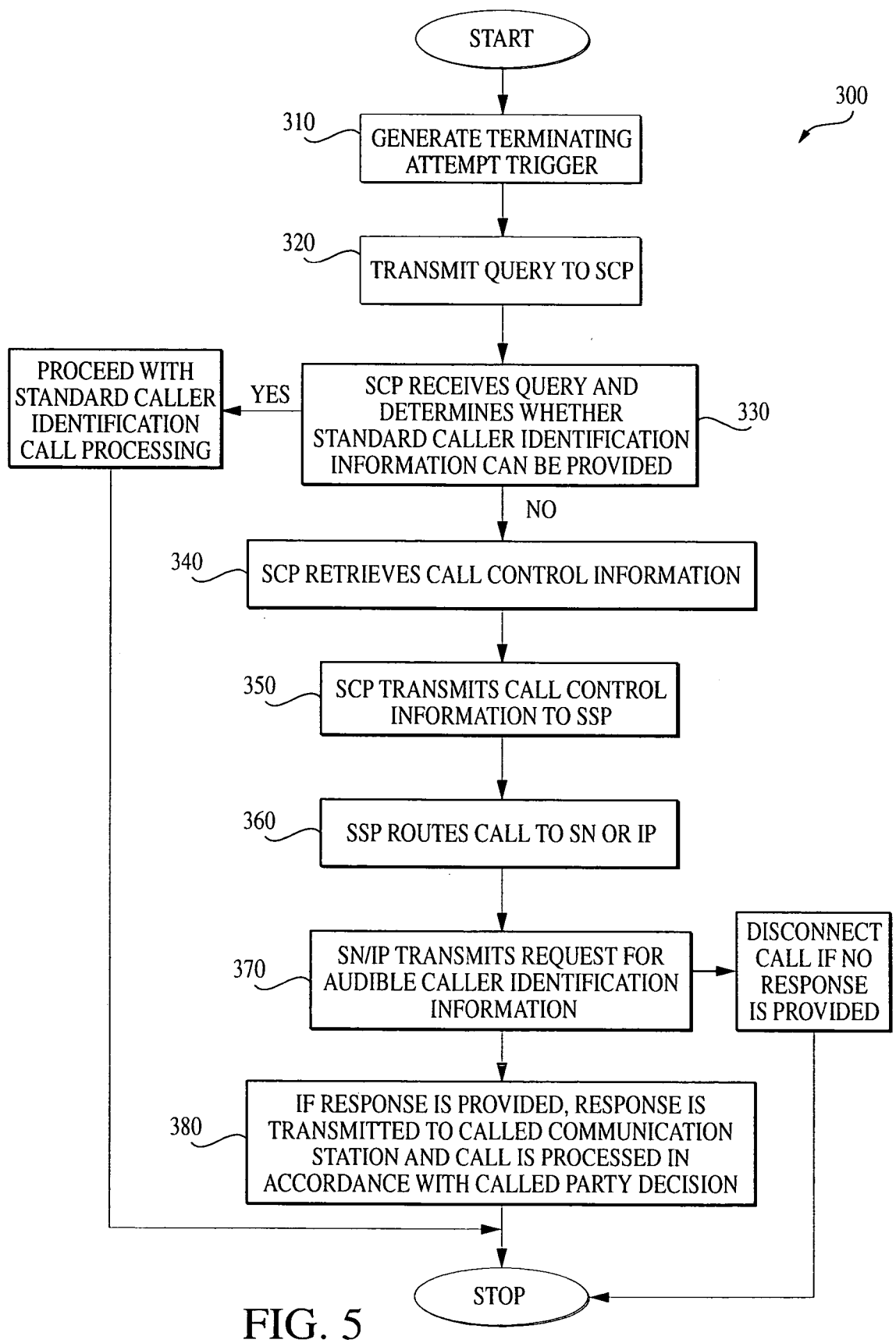
FIG. 5 is a flow chart of a method of a preferred embodiment for providing enhanced caller identification using the system of FIG. 3 or 4.

The systems depicted in FIGS. 3 and 4 can be utilized to implement the method 300 depicted in FIG. 5. For purposes of illustration, assume that a calling party at calling telephone station 262 places a call to a called party at called telephone station 222. In an attempt to connect the call, central office 260 routes the call to SSP 220.

In this embodiment, when the call is routed to SSP 220, a terminating attempt trigger is activated (step 310) when SSP 220 attempts to connect the call to called telephone station 222. The trigger generates a query that is sent to SCP 240 (step 320). The query preferably includes a calling party identification parameter which can include a calling party presentation restriction indicator as known to those skilled in the art and requests the return of standard Caller ID information. The telephone number associated with the calling telephone station 262 is preferably included in the calling party identification parameter of the query as known to those skilled in the art. SCP 240 receives the query and determines whether or not the called party at called telephone station 222 subscribes to the present service. In response to a determination that the called party subscribes to the present service, SCP 240 analyzes the information included with the query to determine whether standard Caller ID information can be provided to called telephone station 222 (step 330).

If the standard Caller ID information cannot be provided, SCP 240 accesses database 242 to retrieve call control information (step 340) and returns the call control information to SSP 220 (step 350). The call control information can be sent to SSP 220 in response to a lead directory number that uniquely identifies each SSP as known to those skilled in the art. In response to the call control information, SSP 220 routes the call to SN 250 or IP 290 (step 360). When SN 250 or IP 290 receives the call, SN 250 or IP 290 generates a request for audible caller identification information that is transmitted to the calling telephone station 262 (step 370). The request preferably comprises a statement indicating that the called party doesn't accept calls from unidentified callers and a request for the calling party to speak his/her name and/or the name of the company that they represent. The request preferably comprises an audible message. Alternatively, the request can be displayed on CPE equipment as known to those skilled in the art. If the calling party provides an audible response, SN 250 or IP 290 enables the audible response to be transmitted to called telephone station 222 (step 380). Alternatively, if the calling party does not provide the requested information, the call is canceled (step 390), preferably after a suitable message is played to the calling party.

Figure 6:
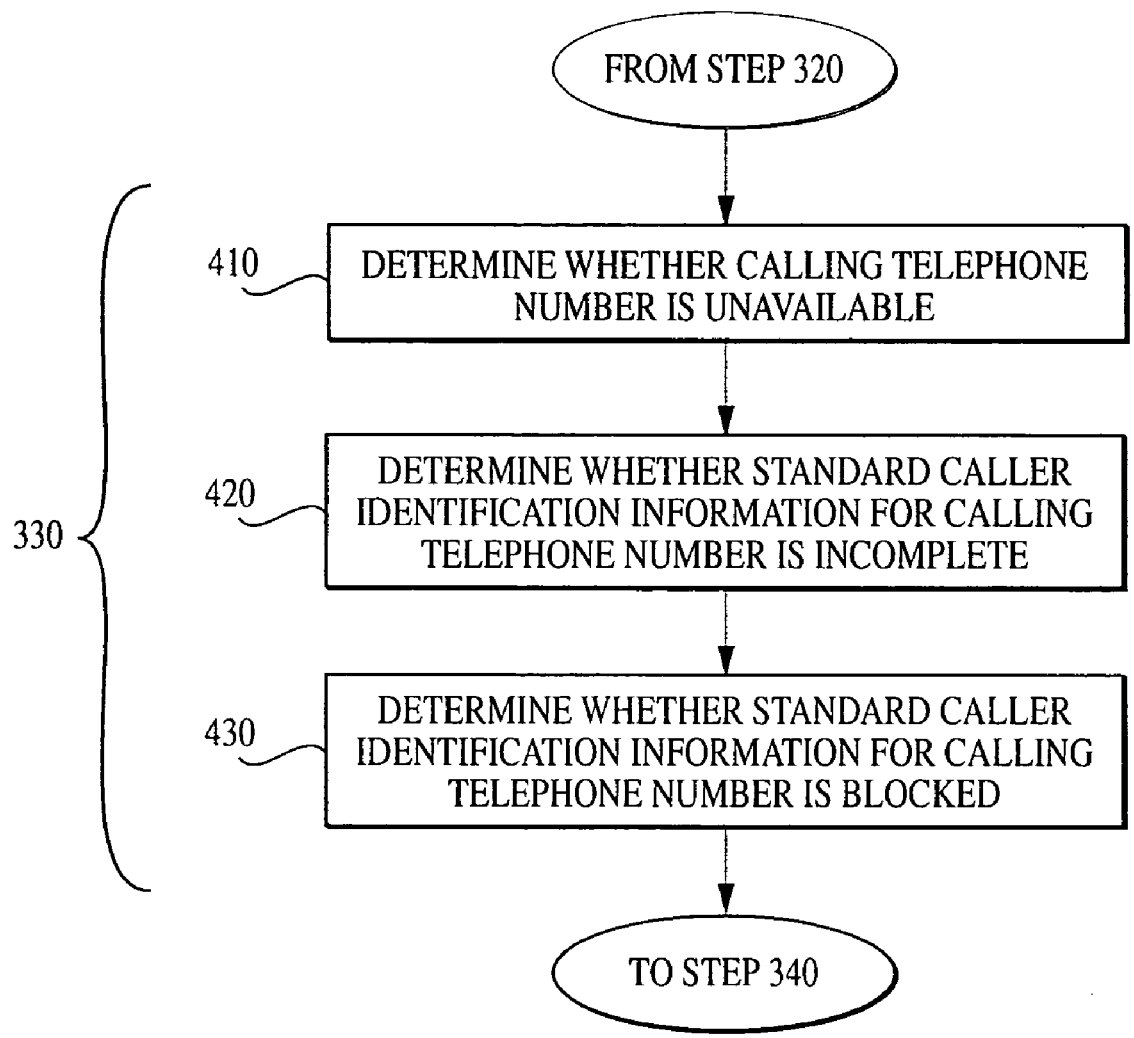
FIG. 6 is a more detailed flow chart of a portion the method of FIG. 5.

The step of determining whether standard Caller ID information can be provided (step 330, FIG. 5) preferably comprises the steps shown in FIG. 6. The SCP 240 preferably first determines whether standard Caller ID information is unavailable (step 410). The SCP 240 preferably determines whether the standard Caller ID information is unavailable by determining whether or not the calling party identification parameter is present in the query as known to those skilled in the art. In addition, the SCP 240 preferably determines whether the standard Caller ID information is incomplete (step 420). The SCP 240 preferably determines whether the standard Caller ID information is incomplete by determining whether or not the calling party identification parameter is a valid telephone number as known to those skilled in the art. In addition, the SCP 240 preferably determines whether the standard Caller ID information has been blocked (step 430). The SCP 240 preferably determines whether the standard Caller ID information has been blocked by determining whether or not the calling party identification presentation restriction indicator is set to "presentation restricted" as known to those skilled in the art.

Figure 7:
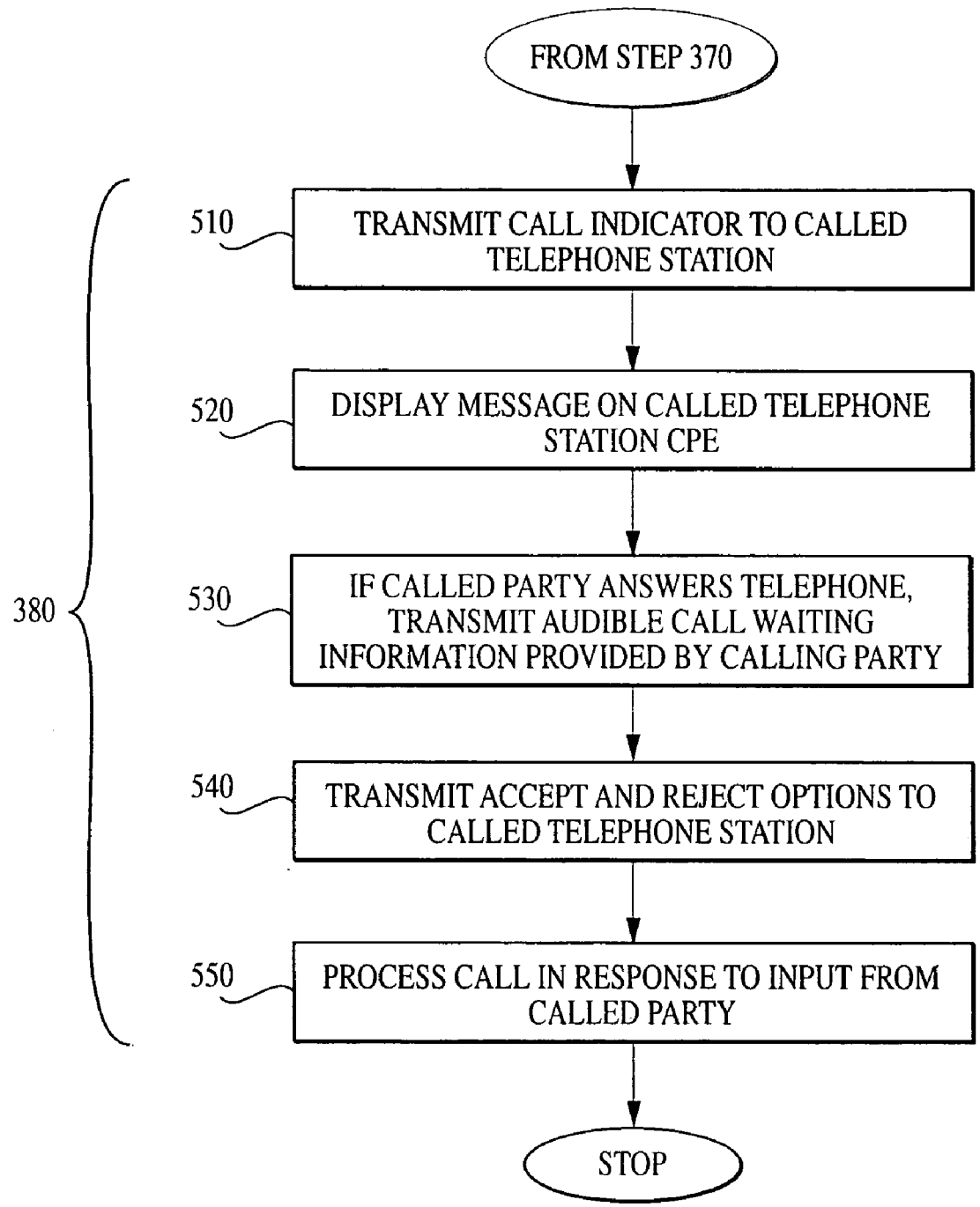
FIG. 7 is a more detailed flow chart of a portion the method of FIG. 5.

The step of providing the audible caller identification information to the called party (step 380, FIG. 5) preferably comprises the steps shown in FIG. 7. Preferably, called telephone station 222 rings (step 510) to signify that a call has been placed to called telephone station 222. While called telephone station 222 is ringing, a text message can be transmitted to called telephone station 222 and the text message can be displayed on the CPE equipment at called telephone station 222 (step 520) as known to those skilled in the art. The text message preferably indicates that the call is being handled by the present service and identifies the name of the present service. If the called party answers the telephone (i.e. the telephone is off hook), the audible caller identification information that was provided by the calling party is transmitted to called telephone station 222 (step 530). The audible caller identification information is preferably recorded and played back to the called telephone station 222 as known to those skilled in the art. Alternatively, the calling telephone station 262 and the called telephone station 222 can be connected such that the audible caller identification information can be transmitted between the telephone stations 262, 222.

After the audible caller identification information has been transmitted, a message is transmitted to called telephone station 222 (step 540). The message preferably includes instructions that allow the called party to accept or reject the call by providing the appropriate input. The message preferably comprises audible instructions that are transmitted by SN 250 or IP 290 to called telephone station 222. The accept and reject options preferably comprise, accepting the call by enabling the connection of the call to the called telephone station 222, canceling the call by disabling the connection of the call to the called telephone station 222, forwarding the call to a voice mail system or another location and sending a message to calling party. The message sent to the calling party can comprise a request that the called party be taken off a telemarketer's call list. Each of these options is preferably invoked when the called party provides the appropriate input.

In response to input provided by the called party, the SN 250 or IP 290 can process the call (step 550). Accordingly, the SN 250 or IP 290 can connect the call, cancel the call, transmit a message to the calling telephone station 262 or forward the call to a voice mail system or another location in response to the input provided by the calling party.

In a further alternative embodiment, the present systems and methods can be configured to work in conjunction with answering machines and voice mail systems. After the called party answers the telephone (step 530, FIG. 7) a message can be transmitted to the called telephone station 222 requesting the called party to provide appropriate input to signify that the call is being answered by a human. The message preferably comprises an audible message and is preferably transmitted to the called telephone-station 222 by the SN 250 or IP 290. The input can comprise any suitable signal such as DTMF tones, dial pulse input, modem/fax input or voice input as known to those skilled in the art. If the called party provides the requisite input, the audible caller identification information provided by the calling party can be transmitted to the called party. However, if input is not provided within a predetermined amount of time, the audible caller identification information is not transmitted to the called party. Instead, the calling party can be connected with the answering machine or the voice mail system and the calling party can leave a conventional message. The preferred time period within which the input must be received to prevent the calling party from being connected with the answering machine or voice mail system is three seconds.

Alternatively, if an answering machine or a voice mail system answers the call, the answering machine or voice mail system can immediately transmit a tone input to the SN 250 or IP 290 to signify that the call is not being answered by a human. In response to the input, the SN 250 or IP 290 can connect the calling party to the answering machine or the voice mail system and the calling party can leave a conventional message.

In order to connect the calling party with the answering machine or voice mail system as described herein, the SN 250 or IP 290 can disconnect from the called telephone station 222 and can place a second call to the called telephone station 222 by dialing the telephone number associated with the called telephone station 222. This second call can then be answered by the answering machine or voice mail system so that the calling telephone station 262 is connected to the answering machine, voice mail system, or called telephone station 222 and the calling party can leave a conventional message.

In a further alternative embodiment, the present system and method can be configured to work in conjunction with standard caller identification services. After the trigger is sent from the SSP 220 (step 320, FIG. 5), the SCP 240 can determine whether the called party at the called telephone station 222 has subscribed to the present service. If the called party has not subscribed to the present service, the call can be handled in accordance with standard Caller ID procedures as known to those skilled in the art. In addition, if the SCP 240 determines that the standard caller identification information can be provided (step 330, FIG. 5), the call can be handled in accordance with standard Caller ID procedures as known to those skilled in the art.

In a further alternative embodiment, a party can be connected with the called telephone station 222 without having to speak his/her name through the use of a password override system as known to those skilled in the art. This can enable the party to, among other things, speak with a party at the called telephone station 222 or remotely access any messages left for them and stored on the answering machine or voicemail system without the party having to speak his/her name as required by the present system. The party can place a call to called telephone station 222 from a remote telephone station. If the party calls from a telephone station for which standard caller identification information cannot be provided, the party will be instructed to speak his/her name as described herein. Rather than speaking his/her name, the party can transmit input, of the form described herein, to the SN 250 or IP 290, to override the present system and enable a connection with the called telephone station without having to speak his/her name. The input can comprise a password or other suitable identification as known to those skilled in the art. The SN 250 or IP 290 can receive this input and compare the input received to data stored within SN 250 or IP 290. The stored data can comprise passwords or other identification data as known to those skilled in the art and can be stored in a reference table as known to those skilled in the art. If the input received matches the data stored, the SN 250 or IP 290 can enable the party to be connected to called telephone station 222, without requiring the party to speak his/her name.

Figure 8:
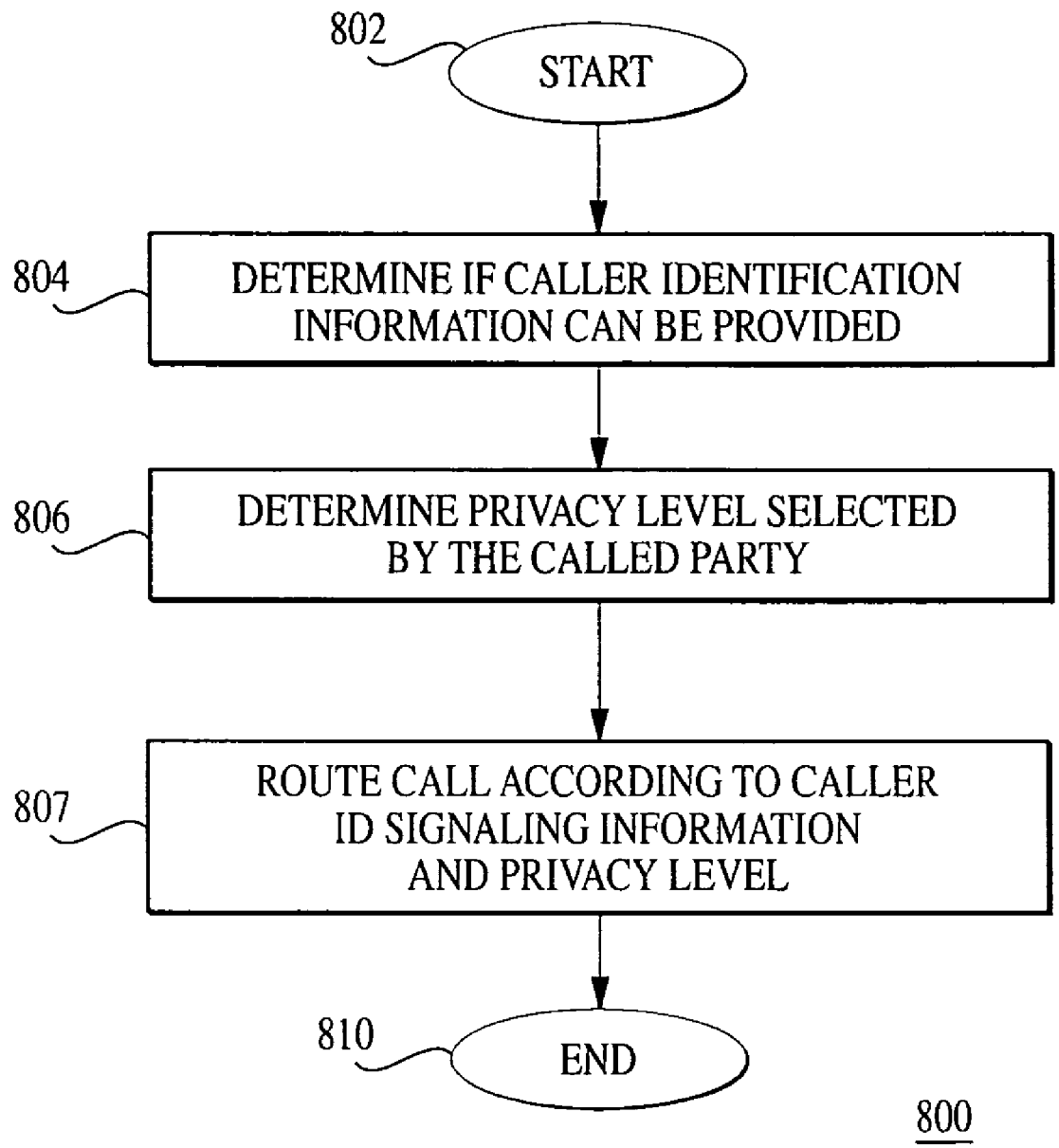
FIG. 8 is a flow chart illustrating a method of providing enhanced caller identification information.

FIG. 8 is a flow chart illustrating a method 800 for providing enhanced caller identification information to a called communication station. In the preferred embodiment, the method operates in accordance with the methods and apparatus described above in connection with FIGS. 1–7, in particular in accordance with the system 200 of FIG. 3 or the system 280 of FIG. 4. The method 800 illustrates processing a call from a calling party at a calling communication station to a called party at a called communication station and begins at step 802.

At step 804, it is determined if standard caller identification information can be provided for the calling communication station to the called communication station. The system may be unable to provide standard caller identification information because, for example, the information is unavailable, because the information is incomplete, because the caller identification information is blocked or because the caller identification information is marked private. Thus, the method steps illustrated in FIG. 6 may be performed to complete step 804. Caller identification information is conveyed in signalling information between SCP 240 and SSP 220 (FIG. 3), in one example.

At step 806, it is determined if a privacy level has been selected by the called party at the called communication station. One example of the process of selecting a privacy level by the called party will be described in further detail below in conjunction with FIG. 10. Information about the privacy level may be stored, for example, in database 242 associated with the SCP 240 (FIG. 3) If a privacy level has been selected, the system detects the selected level for subsequent processing.

At step 808, the system routes the call according to the signalling information and the privacy level. This is illustrated in greater detail in FIG. 9.

Figure 9:
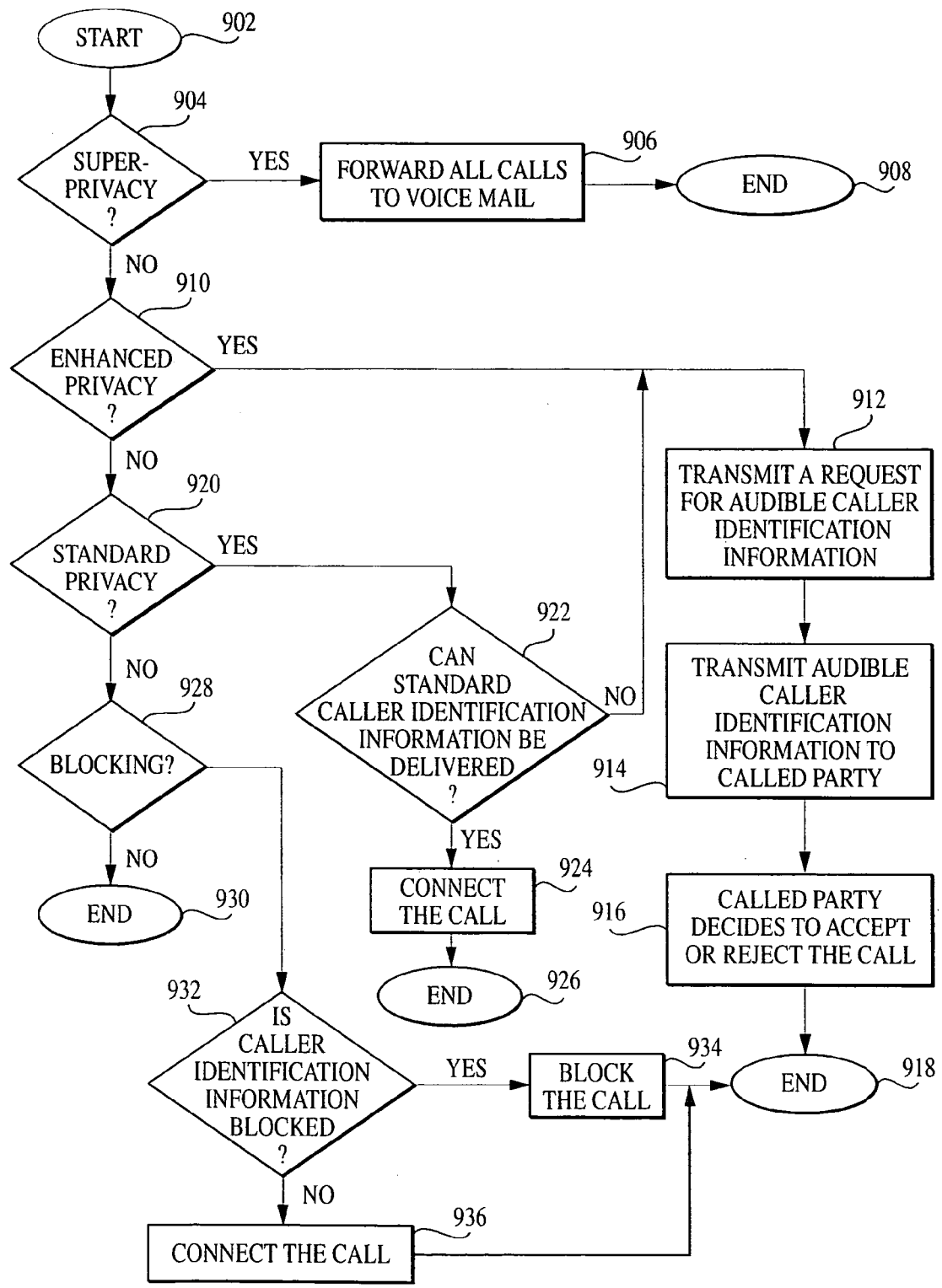
FIG. 9 is a flow chart illustrating in further detail a portion of the method illustrated in FIG. 8.

FIG. 9 is a flow chart illustrating a method 900 showing in further detail a portion of the method illustrated in FIG. 8. The steps of method 900 of FIG. 9 form one embodiment of method step 808 of FIG. 8. Other method steps may be employed in addition or in the alternative. The method 900 illustrated in FIG. 9 begins at step 902.

At step 904, the system determines if the called party has detected a highest level of privacy, referred to in FIG. 9 as a super-privacy level. If so, at step 906, the system forwards all calls including the call currently being processed to a voice messaging system such as voice mail. Using the voice messaging system, a prerecorded message may be played to the calling party rejecting the call or inviting the calling party to leave a message for the called party. The called party's phone does not ring or otherwise indicate the currently processed call and the method ends at step 908.

If at step 904 the called party had not selected the highest level of privacy, at step 910 it is determined if the called party had instead selected a next level of privacy, indicated in FIG. 9 as enhanced privacy. In this mode, all callers are required to record their name and the called party must accept the call before the call is completed. This applies even to a calling party whose caller identification can be provided to the called party. If this mode has been selected at step 912 the system transmits a request for audible caller identification information to the calling party. The request may be a prerecorded message prompting the calling party to speak and provide the audible caller identification information, which is recorded for playback to the called party. At step 914, the audible caller identification information is transmitted to the called party. At step 916, the called party decides to accept or reject the call. The call is either completed or rejected. If the call is rejected, a suitable message may be played to inform the calling party of the outcome of the call. The method terminates at step 918.

If at step 910, the called party had not selected that level of privacy, at step 920 it is determined if the called party had instead selected a next level of privacy, indicated in FIG. 9 as standard privacy. In this mode, if standard caller identification information can be provided to the called party, the call is completed without further intervention by the system. If the standard caller identification information cannot be provided, the calling party is prompted to provide audible caller identification information which is then transmitted to the called party. Thus, in step 922, the system determines if the standard caller identification information can be provided. If so, the call is connected at step 924 and the method ends at step 926. If not, step 912, step 914 and step 916 are performed to obtain the audible caller identification information for the called party.

If at step 920 the called party had not selected the standard level of privacy at step 928 it is determined if the called party selected blocking mode. In blocking mode, calls having caller identification information which is blocked are cancelled without ringing the called party's telephone. A message is preferably played to the calling party to indicate that the calling party is not accepting calls having blocked caller identification information. All other calls are completed. This mode is convenient for screening calls from telemarketers, who typically block caller identification information on their calls. At step 932, it is determined if the caller identification information is blocked. This is evident from the signalling information conveyed with the call. If so, at step 934 the call is terminated, a suitable message is played to the calling party and the method ends at step 918. If the caller identification information is not blocked, at step 936 the call is connected conventionally and the method ends at step 918.

Figure 10:
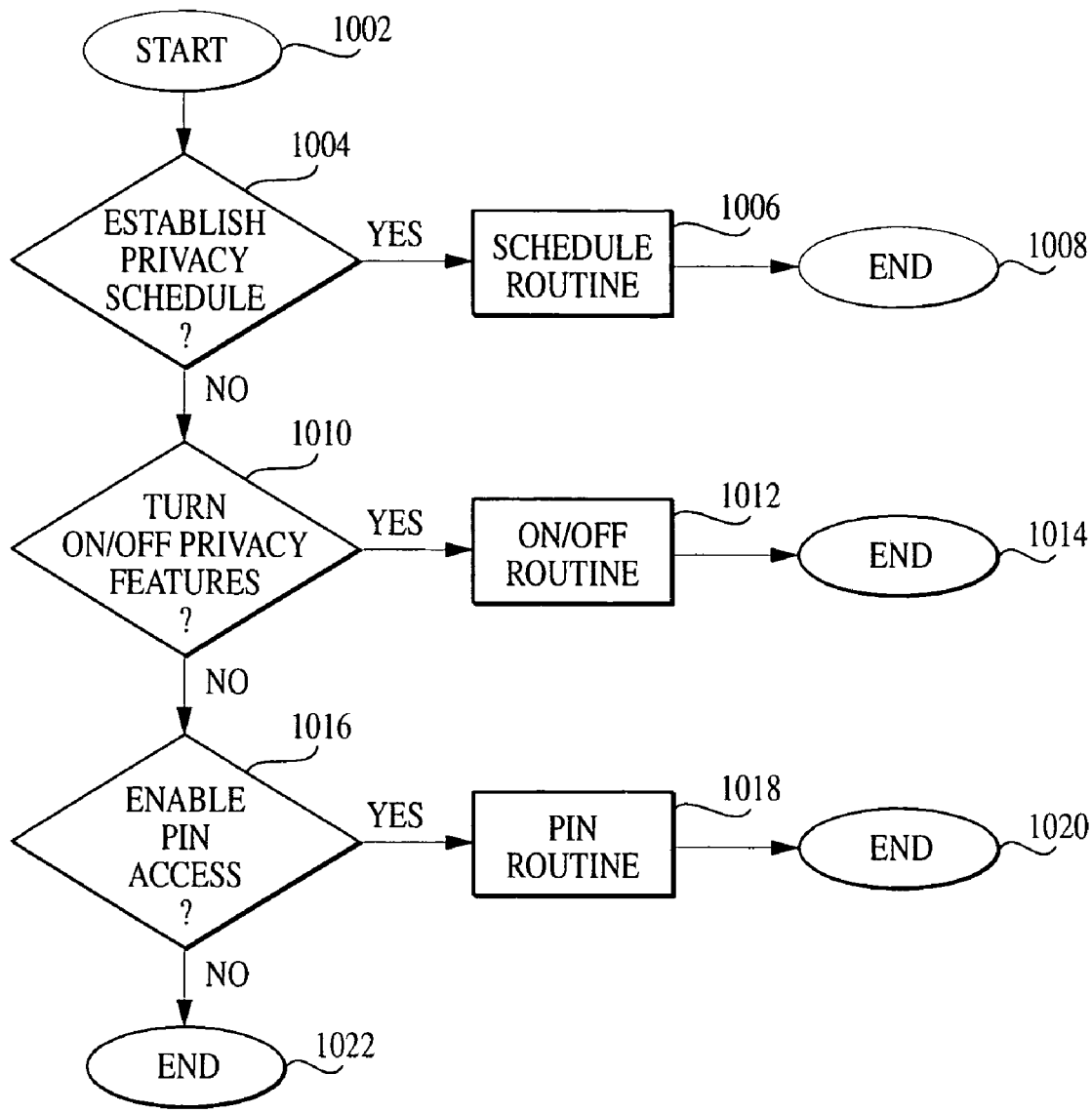
FIG. 10 is a flow chart illustrating in further detail a portion of the method illustrated in FIG. 8.

FIG. 10 is a flow chart illustrating a method 1000 for selecting a privacy level by a subscriber on a system operating in conjunction with the method of FIG. 8. The method 1000 would typically be practiced prior to receipt of a telephone call. The method allows the subscriber to establish a privacy schedule that automatically adjusts the privacy mode based on the time of day. Further, the method allows the subscriber to interactively select a privacy mode based on current circumstances. For example, during dinner or while watching a movie the subscriber may wish to increase the selected privacy level. When waiting for an expected call, the subscriber may wish to decrease the privacy level.

The method 1000 begins at step 1002. At step 1004, the called party has the option to establish a privacy schedule. If this option is selected, at step 1006 a schedule routine is followed. Any suitable routine may be used for establishing the privacy schedule. For example, the subscriber may call a designated telephone and interactively specify schedule times and associated privacy levels using a telephone keypad. A personal computer may access a specified World Wide Web site over the Internet to achieve the same result. If a schedule has been previously set, it may be altered or cancelled. After the schedule is set, the method ends at step 1008.

At step 1010, the subscriber is given the option to interactively turn on or turn off privacy features, including the privacy feature itself. If this option is selected, the system enters an on/off routine at step 12 for interactively processing the subscriber's requests. The method ends at step 1014.

At step 1016, the subscriber is given the option to enable a PIN feature of the privacy system. According to this feature, the subscriber may establish one or more personal identification numbers (PINs) for selected callers to use to bypass one or more of the privacy levels. If the PIN feature is activated, upon calling the subscriber, the calling party may provide personal identification information by providing a PIN or by another means. If the personal identification information matches access information established by the subscriber, one or more levels of the privacy feature can be bypassed and the call completed to the subscriber. If this option is selected, at step 1018 a PIN routine is entered for specifying the PIN and the privacy levels which may be bypassed. The method ends at step 1020. Also, if no option was selected by the subscriber, the method ends at step 1022. Other options may be provided as well.

An alternative embodiment in accordance with the present invention combines the privacy features described above with the features of multiple-ring service available on many telephone systems. In multiple-ring service, two or more ring cadences may be provided to the subscriber line to ring the subscriber's phone. Each ring cadence is associated with one or more called parties on the subscriber line. For example, a call to a teenage child might be signalled by a ring cadence different from the ring cadence provided for the child's family. To use multiple-ring service, a calling party is prompted to provide a personal identity indicator associated with the desired party at the called communication station. This may be done, for example, by playing a recorded message to the calling party and detecting key presses of the telephone keypad by the calling party to indicate the intended recipient of the call. The system determines the intended recipient of the call from among a plurality of called parties at the called communication station and provides signalling information to the called communication station to initiate the appropriate ringing cadence for the intended recipient.

Multiple-ring service may be modified by determining a privacy level associated with the intended recipient and then routing the call in accordance with the caller identification or other signalling information and the recipient privacy level. Each available ring cadence has associated therewith a privacy level which may be selected by a party at the called communication station prior to receipt of any calls. The privacy level may be selected, for example, as illustrated in FIG. 10. Handling of incoming calls is similar to the method 900 of FIG. 9. Additional steps typically include transmitting to the calling party a request for an indication of the intended recipient, in which the calling party is prompted to enter a key press or other indication, receiving the indication, and associating the indication with a privacy level for the intended recipient. Subsequent call processing may be as illustrated in FIG. 9.

The present embodiments provide an efficient and effective method and system for providing caller identification information to a customer when standard caller identification information is unavailable, incomplete, or blocked. The present embodiments further provide greater flexibility for the called party by allowing privacy levels to be customized to the called party's schedule or circumstances or to those of a number of call recipients at the subscriber line. This improves the ability of the called party or subscriber to manage the level of privacy afforded the called telephone by making use of caller identification signalling information included with the call.

It is to be understood that a wide range of changes and modifications to the embodiments described above will be apparent to those skilled in the art and are contemplated. It is therefore intended that the foregoing detailed description be regarded as illustrative rather than limiting, and that it be understood that it is the following claims, including all equivalents, that are intended to define the spirit and scope of the invention.

It is therefore intended that the foregoing detailed description be regarded as illustrative rather than limiting, and that it be understood that it is the following claims, including all equivalents, that are intended to define the spirit and scope of this invention.

The invention claimed is:

1. A method for processing a call from a calling party at a calling communication station to a called communication station in a communication network, the method comprising:

receiving the call at a switch;

activating a terminating attempt trigger at the switch in response to the call;

transmitting a terminating attempt query from the switch to a service control point (SCP) of the communication network in response to the terminating attempt trigger;

at the SCP, in response to the terminating attempt query, determining whether standard caller identification for the calling communication station can be provided to the called communication station;

if standard caller identification for the calling communication station can not be provided, retrieving call control information from a SCP database;

determining from the SCP database a recipient privacy level associated with an intended recipient of the call;

returning the call control information and the recipient privacy level to the switch;

in response to the call control information, routing the call from the switch to a service platform of the communication system;

at the service platform, in response to the call control information and the recipient privacy level, routing the call and all calls to a voice messaging system when the recipient privacy level corresponds to a selected highest privacy level, when the recipient privacy level corresponds to a selected enhanced privacy level, for the call and all calls transmitting a request for audible caller identification information to the calling communication station, transmitting the audible caller identification, if provided, to the called communication station, and further processing the call in response to subsequent input from the called communication station, and when the recipient privacy level corresponds to a selected standard privacy level and when the standard caller identification information cannot be provided to the called communication station, transmitting the request for audible caller identification information for the call to the calling communication station and transmitting the audible caller identification, if provided, to the called communication station, and further processing the call in response to subsequent input from the called communication station.

2. The method of claim 1 further comprising:

determining an intended recipient of the call from among a plurality of callable parties at the called communication station based on the detected signaling information.

3. The method of claim 2 further comprising:

transmitting to the calling party a request for an indication of the intended recipient, and receiving the indication and associating the indication with a privacy level for the intended recipient.

4. The method of claim 3 further comprising initiating a prompt for the calling party to enter a key press as the indication of the intended recipient.

5. The method of claim 3 wherein, at the service platform, when the recipient privacy level corresponds to a selected blocking privacy level and when the call control information indicates that caller identification information for the call is blocked, terminating the call without completion to the called communication station, and connecting the call with the called communication station when the call control information indicates that caller identification information for the call is not blocked.

6. In a Service Control Point (SCP) of a communications network, a method for processing a call from a calling party at a calling communication station to a called communication station in a network, the method comprising:

receiving the call at switching equipment of the network;

at a Service Switching Point (SSP) of the network, generating terminating attempt query in response to an attempt to complete the call from the SSP to the called communication station;

suspending completion of the call to the called communication station;

receiving the terminating attempt query from the SSP of the communication network, the query including a calling party identification parameter and requesting return of standard Caller ID information for the call;

in response to the terminating attempt query, determining if standard Caller ID information can be provided to the called telephone station;

if the standard Caller ID information can not be provided, detecting a privacy level for the called communication station, the privacy level being one of
- a privacy schedule established by a called party,
- a privacy mode selected by a called party, and
- a privacy level bypass designator for bypassing one or more selected privacy levels;

providing call control information to the SSP in accordance with the detected privacy level,
- the call control information controlling routing of the call to a service platform based on the privacy level and causing the service platform generate a request to the calling party for audible caller identification information for at least one specified privacy level,
- the call control information further causing the service platform to record any audible response from the calling party as the audible caller identification information and to play the audible caller identification information from the service platform to the called party and detect call completion instructions from the called party.

7. The method of claim 6 wherein the call control information causes the service platform generate the request to the calling party for audible caller identification information
- for all calls when the privacy level corresponds to an enhanced privacy level, and
- for calls for which the standard Caller ID information can not be provided when the privacy level corresponds to a standard privacy level.

* * * * *

UNITED STATES PATENT AND TRADEMARK OFFICE
CERTIFICATE OF CORRECTION

PATENT NO. : 7,260,196 B2 Page 1 of 1
APPLICATION NO. : 10/873756
DATED : August 21, 2007
INVENTOR(S) : Karen J. Pelletier et al.

It is certified that error appears in the above-identified patent and that said Letters Patent is hereby corrected as shown below:

In the Claims

Columns 12-13, in claim 6, line 30, after "causing the service platform" insert --to--.

Column 14, in claim 7, line 2, after "causes the service platform" insert --to--.

Signed and Sealed this

Eighteenth Day of December, 2007

JON W. DUDAS
*Director of the United States Patent and Trademark Office*